June 29, 1965   H. SCHMID ETAL   3,191,744
APPARATUS FOR HARDENING BEARINGS ON CRANKSHAFTS
Filed April 24, 1962   3 Sheets-Sheet 1

Inventors
Heinrich Schmid
Adolf Graule
By Cushman, Darby & Cushman
Attorneys

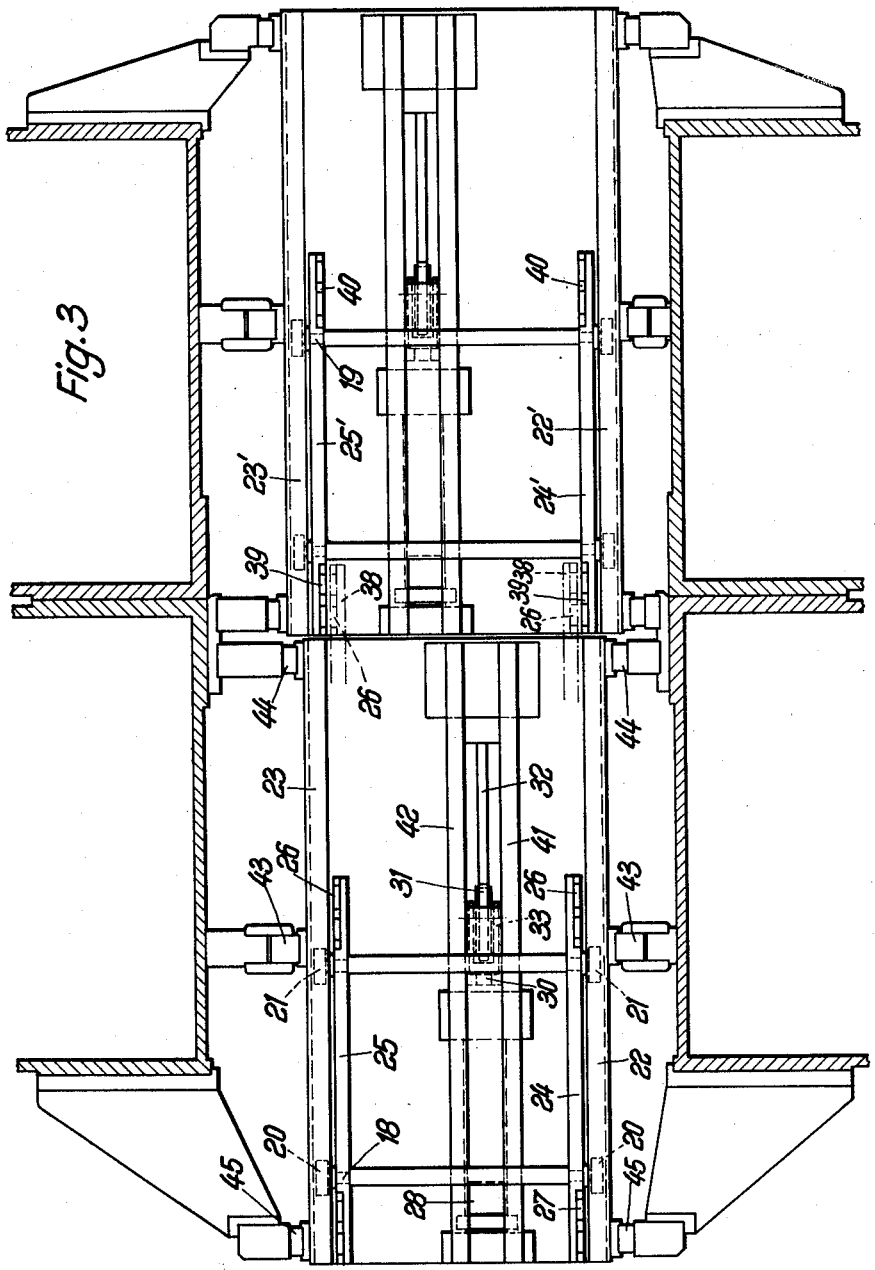

3,191,744
APPARATUS FOR HARDENING BEARINGS
ON CRANKSHAFTS
Heinrich Schmid and Adolf Graule, Wasseralfingen,
Wurttemberg, Germany, assignors to Deutsche Edelstahlwerke Aktiengesellschaft, Krefeld, Germany, Allgemeine Elektricitats-Gesellschaft, Berlin-Grunewald, Germany, and Maschinenfabrik Alfing Kessler Kommanditgesellschaft, Wasseralfingen, Wurttemberg, Germany
Filed Apr. 24, 1962, Ser. No. 189,908
Claims priority, application Germany, Apr. 26, 1961, D 35,923
6 Claims. (Cl. 198—19)

Apparatus has been described in the specification of application No. 154,086 for inductively heating bearings on cranked revolving crankshafts incidental to hardening them.

In one such apparatus there are provided, at two hardening and work chucking stations, inductor units comprising transformers and inductors which only partly embrace the work surfaces. After having been automatically chucked, the work is rotated about the axis of the shaft and exposed to the action of the inductors which yieldingly rest on the crankpins and participate in their orbital motion.

In the said apparatus two such chucking devices for gripping the workpieces and associated units are provided and, in junction with work transporting means, the hardening apparatus is suitably constructed for inclusion in a continuously working production line.

The transporting means in the said apparatus consists of a feeder conveyor means and means for transporting the work from one chucking or hardening station to the other. Both means are embodied in endless chains carrying V-rests or chocks upon which the work rests. The feeder conveyor transfers the workpieces to the transporting means. The individual workpieces are then taken from the point of transfer to the first chucking device where the transporting chain must be stopped until the entire heating and quenching operation has been completed and the workpiece with the hardened crankpin bearings has been re-deposited on the chain. The chain can then start moving again to take the workpiece to the second chucking and hardening station where the main bearings are hardened.

The workpieces are chucked by being gripped between centers and hardening steps take place at both stations simultaneously. As soon as the work in one station has been heated incidental to hardening, power is applied to the second station and the work in this station is likewise heated to the temperature for hardening, whilst quenching at the first station begins. Consequently the transporter chain must remain stationary for the sum of the periods required for heatinng the crankpin bearings and the main bearings at the respective stations. If it were desired to avoid this, either two generators would have to be provided for feeding the two inductors or one generator of correspondingly higher capacity. If this were done, heating at both stations could be simultaneous.

It is however desirable to increase output and to reduce the time taken for performing the complete working cycle without any increase in the installed electrical power.

It is the object of the present invention to provide apparatus which permits the period of a complete operational cycle to be shortened and apparatus according to the present invention accordingly comprises the provision of independent work-transporters for co-operation with the gripping means at each station and constructed and arranged so as by relative displacement to cause a crank shaft that has been treated at one station to be conveyed and transferred to the transporter which conveys the said crank shaft to the gripping means at the next station.

When the previously proposed chain is used as transporting means the work is lifted off the chocks on the chain because the centers of the gripping device are located only a few millimetres above the center axis of the work when this is presented to the chucking device whilst resting on the chocks. Lifting the work a few millimetres is quite sufficient in the case of crankshafts which comprise sections which need not be hardened and which can provide surfaces for depositing the work on the chocks. However, in the case of shafts which have no such surfaces because the chocks are located in the region of bearings which are to be hardened, the close presence of the chocks is a nuisance because they interfere with a uniform distribution of the quenching medium.

It is a further object of the present invention to provide apparatus which permits shafts to be treated which do not have surfaces which need not be hardened for resting them on the chocks. This may be achieved by associating with each chucking device a transporting truck provided with two pairs of chocks, each of these trucks performing a motion defined by a rectangular path perpendicular to the axis of the supported workpieces. The horizontal parts of the paths of the two handling trucks overlap in the region between the two chucking stations. At this point of overlap the work is transferred from one truck to the next, the arrangement being such that at the point of transfer the pair of chocks on one truck will be located offset vertically above a co-operating pair of chocks on the other truck to permit the transfer.

For moving the trucks in the horizontal direction they may be positively guided on rails. Below each truck a horizontal cylinder may be arranged containing a movable piston with a piston rod which at its end carries a pinion simultaneously meshing with a stationary rack and with a rack affixed to the associated truck, thus permitting the truck to be horizontally traversed to and fro.

The rails upon which the truck runs may form part of a frame which is adapted to be raised and lowered hydraulically by means of a cylinder and a piston.

The up and down motions of the frame may be synchronized with the motions of the inductors of the several units in such a way that the inductors rise at the same time as the frame and the truck are raised, the inductors descending when the frame and its truck descend. The up and down motions as well as the traversing motions in the horizontal directions may be synchronized and interlocked in conventional manner with the aid of limit switches co-operating with relays.

In order to ensure that the workpieces to be treated are properly gripped by the chucking devices in working position the workpieces must be correctly orientated on the conveyor means. The workpieces delivered from the previous station in the production line are likely to arrive with their crankpins in different angular positions in relation to the horizontal plane of transportation. Preceding the point of delivery of the work from the feeder conveyor to the handling truck two loose rotatable disks may be provided in the path of motion of the work, located at different elevational levels consecutively in the direction of motion of the work. The spacing of the disk axes can be adjusted. Adjustment is effected in such a way that the first disk will turn the work so that its crankpins are lifted into the center plane, whereas the second disk ensures that the pin cannot be above this center plane when the work has passed underneath it.

A preferred embodiment of the invention is shown in the drawings to which reference will now be made in a more detailed description of the invention. In the drawings:

FIG. 3 is a further enlarged plan view of the two handling trucks on the line 3—3, FIG. 2.

Figure 1:
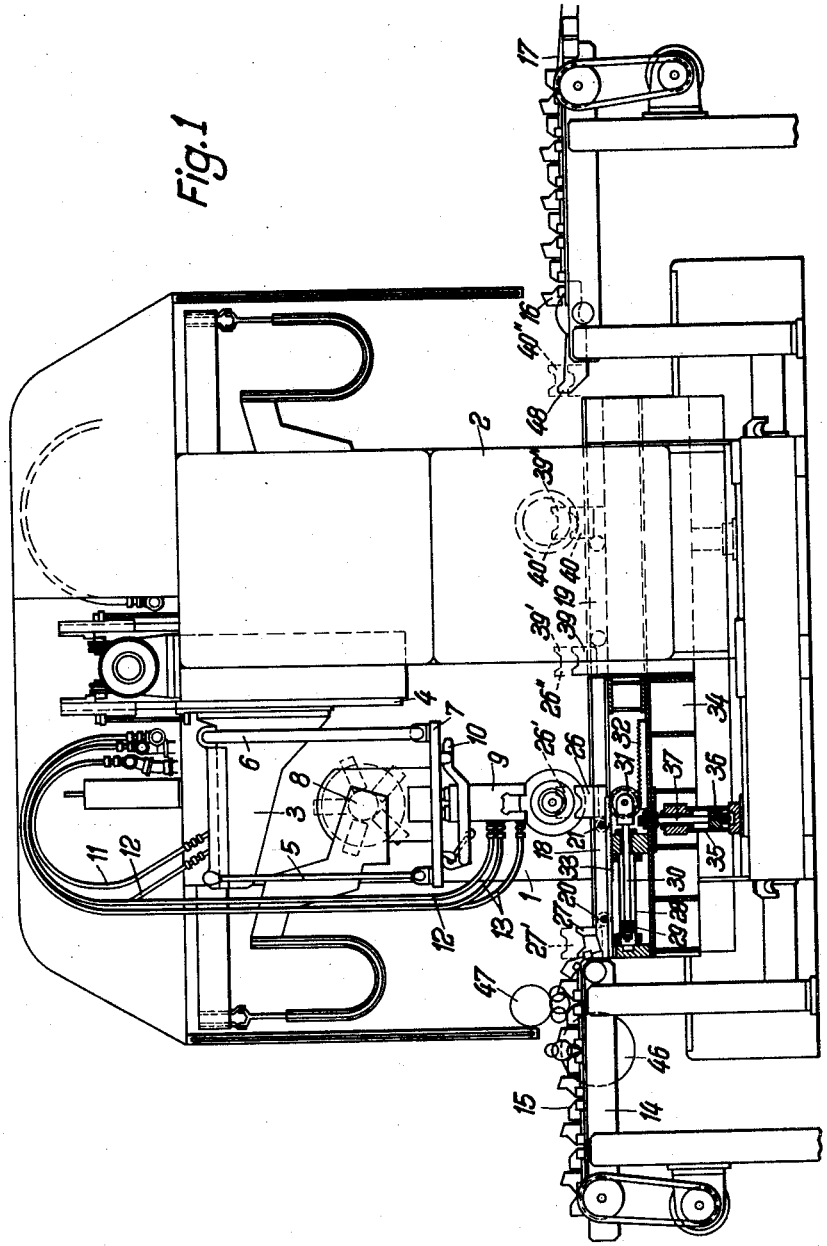
FIG. 1 is a side elevation of the machine on the line 1—1, FIG. 2.

The frame of the machine, as in the machine described in the aforesaid specification, comprises two similar halves 1 and 2. Each of these halves 1 and 2 accommodates a hardening station. The front panel of the left hand half of the machine shown in the drawing has been removed to reveal the heating and hardening devices. These comprise a supporting table or bracket 3 which can be raised and lowered in keyways 4. Suspended on rods 5 and 6 from this table is a bottom plate 7 which carries a transformer 8. Below this plate is an inductor 9 attached to a lever 10 permitting the inductor to be easily replaced. The tubing for the supply of cooling water to the transformer and the inductor is shown at 11. Moreover, a quenching fluid is supplied through tubing 13 to the sprayers built into the inductor. The inductor units of which a suitable number is provided to agree with the number of throws or bearing surfaces on the crankshaft are lowered on to the crankshaft when the hardening operation is about to begin and they participate in the crank motions as the crankshaft is revolved. The parallel linkage supporting the inductors is fully described in the aforesaid specification and a detailed description will not therefore be given herein.

As in the apparatus described in the aforesaid specification, a feeder means 14 is provided. This consists of an endless chain which carries prismatic chocks or V-rests 15 for supporting the crankshaft. On the opposite side is another chain-type conveyor 16 upon which the hardened workpieces are conveyed to a chute or the like 17.

The transporting chains provided in the apparatus described in the aforesaid speecification for presenting the workpieces to the chucking devices of the hardening station and for carrying away the hardened work are replaced by trucks. A truck 18 is associated with the chucking and hardening station at 1, and a truck 19 cooperates with the corresponding station at 2. Truck 18 is provided with two pairs of rollers 20 and 21. These rollers are positively guided in the horizontal direction in rails 22 and 23. The truck as such comprises two beams or stringers 24 and 25 upon which the supports for the work in the form of pairs of chocks 26 and 27 are mounted.

The rails 22 and 23 form part of a frame 34. Located in this frame below truck 18 is a cylinder 28 with a piston 29 and piston rod 30. Mounted on the end of the piston rod is a pinion 31 which meshes with a rack 32 on frame 34 as piston 29 moves to and fro. Underneath the truck is another rack 33, likewise engaged by pinion 31 in such manner that reciprocation of the piston causes the truck to move to and fro through twice the distance of the piston stroke.

Frame 34 can be raised and lowered by the piston rod 37 of a piston 36 working in a cylinder 35.

Truck 19 which is associated with the chucking and hardening station at 2 is constructed in a generally similar way. This also applies to the arrangements made for horizontally and vertically moving the truck, the only difference being that the rails 22' and 23' are spaced slightly further apart, so that truck 19 is a little wider than truck 18. The truck stringers 24' and 25' are therefore able to pass laterally alongside the stringers 24 and 25 of truck 18. The traverse of truck 18 is such as to permit it to move into the position indicated by dotted lines at 38 (FIG. 3). This position at 38 is the transfer position in which a workpiece can be transferred from truck 18 to truck 19. During this transfer, truck 18 is in its upper and truck 19 in its lower position. The pair of chocks 26 on truck 18 is located above the pair of chocks 39 on truck 19, but the two chocks of the pair 26 are spaced more closely together than the chocks of pair 39.

For effecting the transfer truck 18 is lowered until it is level with truck 19 in its lowered position. Truck 19 then rises, permitting truck 18 to move horizontally to the left. The workpiece is thus deposited on truck 19.

The rectangular paths of motion traversed by the two carriages to feed workpieces into chucking position and to carry them away from said position must be precise, as otherwise trouble will arise in the gripping of the workpieces and in their transfer from truck to truck and/or to the delivery conveyor means.

Apart from rails 22 and 23 additional guide rails 41 and 42 are associated with the trucks. These latter rails are associated with the rack 33 and are parallel therewith. For guiding the frame in the vertical direction guide means 43, 44 and 45 are provided. These ensure that the frame is not twisted or distorted when it is raised or lowered.

In order to transfer the workpieces from the feeder conveyor 14 to truck 18 in a desired position two loose rotatable disks 46 and 47 are provided immediately in front of the transfer point. These are located at two different levels consecutively in the direction of motion of the work. The bottom disk 46 turns the crankshaft until the crank throws align vertically. The second disk 47 then turns the crankshaft from this position until the cranks are in a given angular position. This position is such that after having been deposited on truck 18 the crankshaft will be in the correct position for subsequent chucking.

The operational cycle of the machine is roughly as follows:

The feeder conveyor 14 deposits a crankshaft on the pair of chocks 27. The frame carrying truck 18 then rises, thus bringing the pair of chocks 27 into the position marked 27'. When this transfer takes place a preceding workpiece which has just been hardened will still be gripped between the centers at station 1. However, as the truck rises it carries up not only the pair of chocks 27 but also the second pair of chocks 26 which thus reach the position marked 26'. The workpiece between the centers is now released and is received on the pair of chocks 26. Truck 18 can now be traversed to the right. Consequently the workpiece resting on chocks 27 is presented to the chucking devices, whereas the workpiece on chocks 26 reaches transfer point 38 where it is ready to be transferred to the second truck 19. The pair of chocks 26" is thus at the transfer point when the pair of chocks 39 on truck 19 is at the same point in lowered position. The workpiece which has reached chucking position can now be gripped whereupon truck 18 and its frame can be lowered to bring the two pairs of chocks 26 and 39 level. Truck 19 now begins to rise. When this upward motion has been completed truck 18 is retracted horizontally to home position towards the left.

The pair of chocks 39 on truck 19 is then in position 39' and by being traversed to the right it reaches position 39" where the work is gripped to be hardened.

Previously the pair of chocks 40 had received a hardened crankshaft from chucking position and, as a result of the last traverse of truck 19 this workpiece is now in position 40". It is here deposited on the intermediate receiver 48 and taken over by the delivery conveyor 16 which carries it away.

Figure 2:
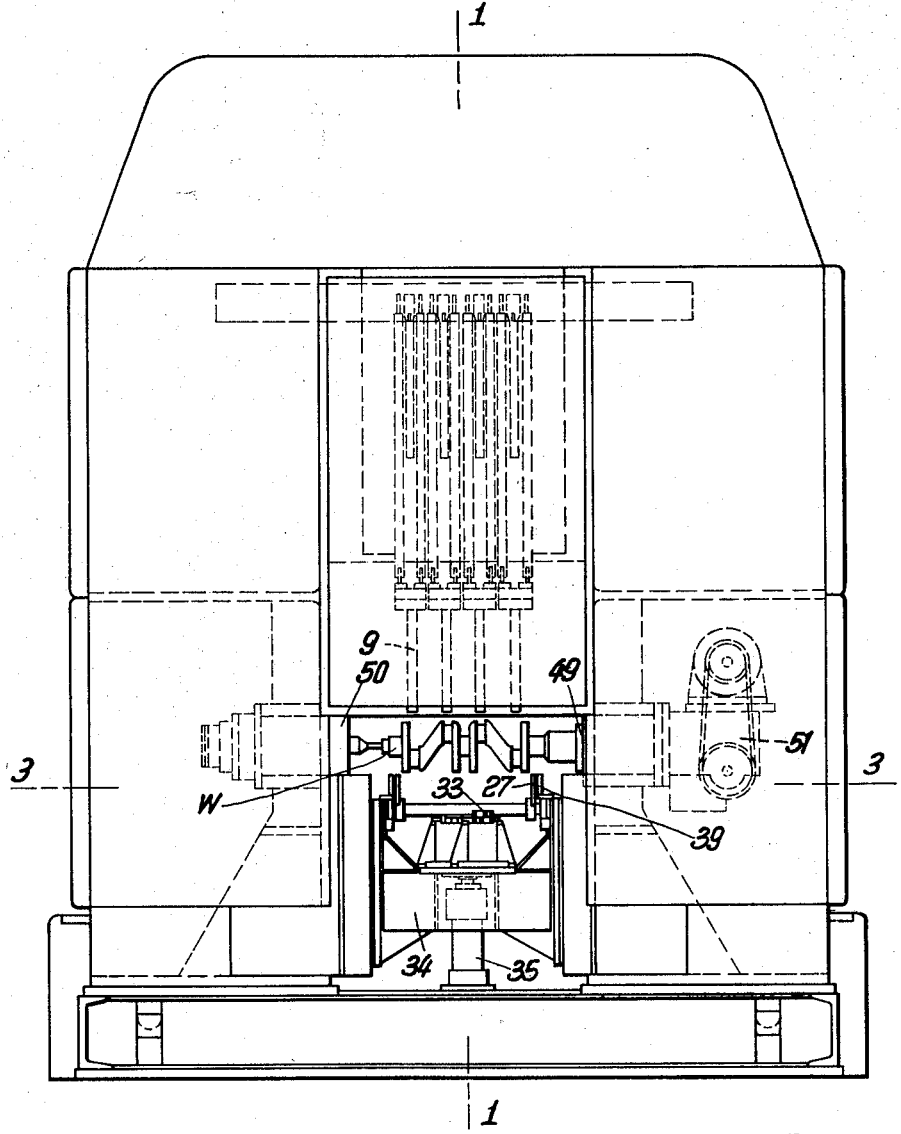
FIG. 2 is a somewhat enlarged end-on view of the machine without the feeder conveyor.

FIG. 2 shows the manner in which the crankshaft W is gripped between two centers 49 and 50. Center 49 is rotated through gearing indicated at 51. However, before rotation of shaft W begins, the inductors 9 are deposited on the bearings and frame 34 is lowered. It can be subsequently raised at any suitable time. The bearings are thus completely free from the transporting truck and they can be heated and quenched as required. Moreover, it will be understood from the manner in which the transporting trucks operate, that work is heated in one station whilst the inductor in the other station is inactivated and raised for the release and removal of a workpiece that has just been treated. The provision of a single generator is therefore sufficient to feed both inductors in turn.

What we claim is:

1. In apparatus for inductively heating, incidental to hardening, bearing surfaces of work in the form of crankshafts, comprising at successive stations units each comprising a transformer and at least one inductor adapted only partially to embrace the surface of the work and means for gripping and rotating the work; means for presenting an inductor to the work so that this yieldingly rests on a crank pin and participates in its orbital motion, and means for automatically transporting the work to present it to the said gripping means, the improvement which comprises the provision of successive independent work-transporters for cooperating with the gripping means at each station and means for relatively displacing said transporters to cause a crankshaft that has been treated at one station to be conveyed and transferred to the transporter which conveys the said shaft to the gripping means at the next station, each said transporter being provided with work-supporting means, the said work supporting means of one said transporter being transversely offset relatively to the work-supporting means of the other said transporter and said transporter-displacing means being operative to cause relative displacement of the said transporters out of their normal respective planes to enable the work to be transferred from the work-supporting means of the said one transporter to the work-supporting means of the said other transporter.

2. In apparatus for inductively heating, incidental to hardening, bearing surfaces of work in the form of crankshafts, comprising at successive stations units each comprising a transformer and at least one inductor adapted only partially to embrace the surface of the work and means for gripping and rotating the work; means for presenting an inductor to the work so that this yieldingly rests on a crank pin and participates in its orbital motion, and means for automatically transporting the work to present it to the said gripping means, the improvement which comprises the provision of independent work-transporters for cooperating with the gripping means at each station and means for relatively displacing said transporters to cause a crankshaft that has been treated at one station to be conveyed and transferred to the transporter which conveys the said shaft to the gripping means at the next station, each said transporter being provided with two pairs of work-supporting chocks, said transporter-displacing means being operable to cause each transporter to perform a motion defining a rectangular path perpendicular to the axes of work supported by said chocks, the transporters being constructed and arranged to permit the horizontal portions of the respective paths of the two transporters to overlap between the gripping means of adjacent stations for the transfer of the work from one transporter to the other in such manner that the pair of chocks of one transporter is brought into a position offset above a pair of chocks on the other transporter to permit the transfer movement.

3. Apparatus according to claim 2 in which the transporters are in the form of trucks and rails are provided along which the trucks run, the rails being vertically movable.

4. Apparatus according to claim 3 comprising a horizontal cylinder below each truck with a movable piston and piston rod which at its end carries a pinion meshing with a fixed rack and with a rack affixed to the truck for moving the truck.

5. Apparatus according to claim 3 in which the truck rails form part of a frame, and means for hydraulically raising and lowering the said frame.

6. In apparatus for inductively heating, incidental to hardening, bearing surfaces of work in the form of crankshafts, comprising at successive stations units each comprising a transformer and at least one inductor adapted only partially to embrace the surface of the work and means for gripping and rotating the work; means for presenting an inductor to the work so that this yieldingly rests on a crank pin and participates in its orbital motion, and means for automatically transporting the work to present it to the said gripping means, the improvement which comprises the provision of successive independent work-transporters for co-operating with the gripping means at each station and means for relatively displacing said transporters to cause a crankshaft that has been treated at one station to be conveyed and transferred to the transporter which conveys the said shaft to the gripping means at the next station, each said transporter being provided with work-supporting means, the said work supporting means of one said transporter being transversely offset relatively to the work-supporting means of the other said transporter and said transporter-displacing means being operative to cause relative displacement of the said transporters out of their normal respective planes to enable the work to be transferred from the work-supporting means of the said one transporter to the work-supporting means of the said other transporter, said transporters including a first transporter, a feeder conveyor for supplying said first transporter and comprising two freely rotatable disks in the path of portion of the work and located consecutively in the direction of motion at two different elevational levels preceding the point of transfer of the work from the feeder conveyor to the said first transporter for turning said crankshaft about its axis for establishing a predetermined orientation of the crankshaft.

References Cited by the Examiner

UNITED STATES PATENTS

| | | | |
|---|---|---|---|
| 1,686,696 | 10/28 | Hirschmann | 198—219 |
| 2,543,280 | 2/51 | Everett | 198—19 |
| 2,593,311 | 4/52 | Johnson et al. | 198—19 |
| 2,771,173 | 11/56 | Sharp | 198—19 |
| 2,787,566 | 4/57 | Seulen et al. | |
| 2,804,962 | 9/57 | Sherman | 198—219 X |
| 2,964,159 | 12/60 | Boyer | 198—19 |
| 2,995,641 | 8/61 | Seulen et al. | 219—10.69 |

HUGO O. SCHULZ, *Primary Examiner.*

RICHARD M. WARD, *Examiner.*